(12) United States Patent
Yamamoto et al.

(10) Patent No.: US 7,122,218 B2
(45) Date of Patent: Oct. 17, 2006

(54) TASTE ENHANCER

(75) Inventors: Taichi Yamamoto, Hiratsuka (JP); Tadahiro Hiramoto, Hiratsuka (JP); Toshinori Saima, Hiratsuka (JP)

(73) Assignee: Takasago International Corporation, Tokyo (JP)

( * ) Notice: Subject to any disclaimer, the term of this patent is extended or adjusted under 35 U.S.C. 154(b) by 0 days.

(21) Appl. No.: 10/360,729

(22) Filed: Feb. 10, 2003

(65) Prior Publication Data
US 2003/0157240 A1   Aug. 21, 2003

(30) Foreign Application Priority Data

Feb. 8, 2002   (JP) ............................ P.2002-031896
Jan. 22, 2003  (JP) ............................ P. 2003-014082

(51) Int. Cl.
*A23L 1/222* (2006.01)

(52) U.S. Cl. .................. 426/651; 426/386; 426/478; 426/616; 426/650

(58) Field of Classification Search ................ 426/386, 426/387, 429, 478, 490, 492, 615, 616, 650 426/651
See application file for complete search history.

(56) References Cited

U.S. PATENT DOCUMENTS 3,920,849 A    11/1975  Marmo et al.
5,362,714 A    11/1994  Radford et al.
6,495,193 B1 * 12/2002  Hiramoto et al. ........... 426/651
2001/0021407 A1  9/2001  Hiramoto et al.

FOREIGN PATENT DOCUMENTS

| EP | 0 198 591 A | 10/1986 |
|---|---|---|
| JP | 62-275199 | 11/1987 |
| JP | 8-154619 | 6/1996 |
| JP | 9-94080 | 4/1997 |
| JP | 3133182 | 11/2000 |
| JP | 2001-133 | 1/2001 |

OTHER PUBLICATIONS

XP-002239712-Dugo P. et al., "Oxygen heterocyclic compounds of bergamot essential oils", Rivista Italiana EPPOS (1999).
XP-002239713-Fleisher A et al., "Ultra-tech citrus concentrates—a new series of deterpenified citrus oils", Perfumer & Flavorist (1987).
XP-002239714-Derwent Publications, Ltd. Abstract of J 62-275199A, Hasegawa Co., Ltd. (1987).
European Search Report dated Jun. 6, 2003.
Shaw, Philip e., "Citrus Essential Oils." Perfumer & Flavorist, vol. 3, Dec./Jan., 1979, pp. 35-36.

* cited by examiner

*Primary Examiner*—Leslie Wong
(74) *Attorney, Agent, or Firm*—Sughrue Mion, PLLC

(57) ABSTRACT

A taste enhancer comprising a high-boiling fraction of cold-pressed citrus oil as an active ingredient. The taste enhancer is environment- and human-friendly and, when added to a food, enhances the tastes inherent to the food, such as volume, juiciness, body, and mildness.

10 Claims, 2 Drawing Sheets

TASTE ENHANCER

FIELD OF THE INVENTION

This invention relates to a taste enhancer and a method of enhancing taste. Namely, the invention relates to a taste enhancer characterized by containing the high-boiling point fraction obtained from a citrus cold press oil as the active ingredient and a method of enhancing taste. The invention further relates to a process for producing the taste enhancer. The invention also relates to foods, drinks and compositions for the oral cavity containing the taste enhancer.

BACKGROUND OF THE INVENTION

Various attempts have been made to satisfy a desire to have more delicious foods. As one of these attempts, there has been known a method wherein various compounds are preliminarily blended with a food to give a favorable taste at taking the food. For example, Document 1 discloses a technique of adding protamine and/or its salt to a drink to eliminate or lessen its bitterness or astringency, while Document 2 proposes to add a water-extract of coffee beans to relieve the sourness of a food or a drink containing organic acids. Moreover, Document 3 reports that the characteristic taste of a souring agent can be improved by adding water-soluble dietary fiber to the souring agent. Although these methods are somewhat efficacious in lessening astringency or bitterness or relieving sourness, little effect of enhancing the inherent taste of a food can be achieved thereby.

To solve this problem, Document 4 discloses a technique of extracting fresh vanilla pots with a polar solvent and adding the thus obtained extract to various foods or drinks. However, the above-described problem cannot be sufficiently solved even by this technique.

Furthermore, there has been required to develop a material of improved performance of not only enhancing the characteristic taste of a food or a drink but also being nondetrimental to the environment and humans.

Document 1:
Japanese Patent No. 3133182.

Document 2:
JP-A-9-94080.

Document 3:
JP-A-2001-133.

Document 4:
JP-A-8-154619.

An object of the present invention is to provide a taste enhancer having an excellent effect of enhancing the taste of a food, a drink or a composition for the oral cavity and to provide a taste enhancing method. Another object of the present invention is to provide a taste enhancer which is friendly to the environment and humans. The term "taste enhancer" as used herein, which is a so-called flavor enhancer, is a compound having no excellent taste per se but exerting an effect of further enhancing the taste of a tasty compound, food, drink or composition for the oral cavity coexisting therewith.

SUMMARY OF THE INVENTION

The inventors have conducted intensive studies to solve the above-described problems and consequently found out that the high-boiling point fraction or dewaxed high-boiling point fraction obtained from a citrus cold press oil exhibits an excellent taste enhancing effect. As a results of further studies, they have completed the present invention.

Accordingly, the invention provides:

1) a taste enhancer comprising a high-boiling point fraction of a citrus cold press oil as the active ingredient;

2) the taste enhancer, wherein the high-boiling point fraction is a distillation residue after distillation of a citrus cold press oil;

3) the taste enhancer, wherein a normal hexane or ethyl acetate solution containing the high-boiling point fraction at a concentration of 0.04 (mg/ml) in normal hexane or ethyl acetate shows an ultraviolet absorbance of 0.01 or above;

4) a process for producing a taste enhancer comprising distilling a citrus cold press oil;

5) a food or a drink comprising a taste enhancer as set forth in any of 1) to 3);

6) a composition for the oral cavity characterized by containing a taste enhancer as set forth in any of 1) to 3); and 7) a method of enhancing the taste of a food, a drink or a composition for the oral cavity characterized by using a taste enhancer as set forth in any of 1) to 3)

BRIEF DESCRIPTION OF THE DRAWINGS

By way of example and to make the description more clear, reference is made to the accompanying drawing in which.

DETAILED DESCRIPTION OF THE INVENTION

Figure 1:
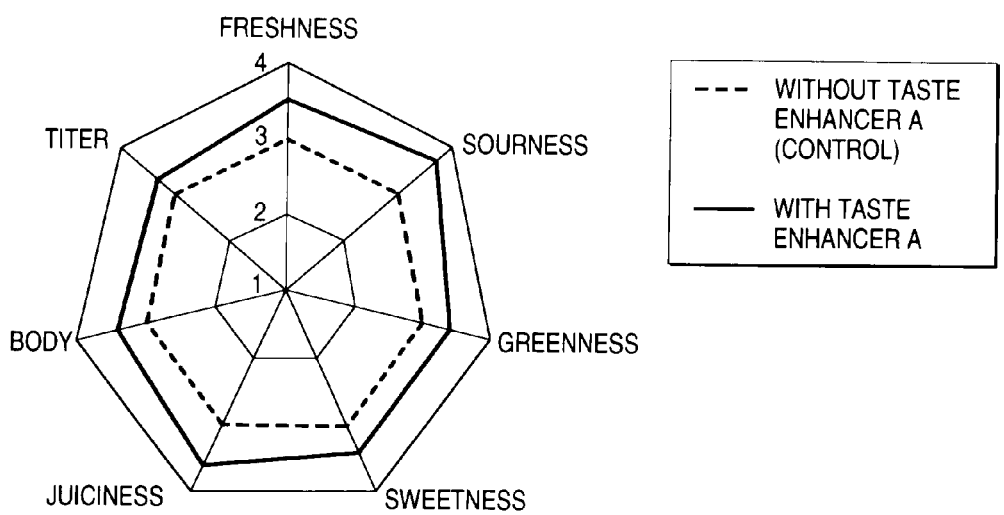
FIG. 1 is a graph showing the taste enhancement in strawberry flavored chewing gum in Test Example 2.

Now, the invention will be described in greater detail.

The citrus cold press oil has been widely known for a long time. It is usually prepared from a citrus fruit, in particular, its pericarp.

In the present invention, a commercially available citrus cold press oil may be used. Alternatively, a citrus cold press oil may be prepared from a citrus fruit by a method commonly employed in the art (cf., Perfumer & Flavorist, Vol. 3, Dec./Jan., 1979, pp. 35–36).

Examples of citrus fruits usable in the citrus cold press oil of the invention include bergamot, lemon, lyme, grapefruit, sweet orange, bitter orange, mandarin, tangerine, *unshu* (*Citrus unshu* MARC.), blood orange, sour orange, yuzu (*C. junos*), iyokan (*C. Iyo* Hort. ex TANAKA), sudachi (*C. sudachi* Hort. ex SHIRAI), kabosu (*C. sphaerocarpa* Hort. et TANAKA) and the like, though the present invention is not restricted thereto.

The taste enhancer according to the present invention contains as an active ingredient the high-boiling point fraction prepared from the citrus cold press oil as described above.

The high-boiling point fraction may be obtained by various methods. As typical examples thereof, the distillation method and the column method may be cited.

Now, the distillation method will be illustrated.

First, the citrus cold press oil serving as the starting material is fed into a distillator and slowly heated therein under reduced pressure. Then the distillate is referred to as the low-boiling point fraction while the residue remaining in the distillator is referred to as the high-boiling point fraction. More specifically speaking, the residue obtained after heating the citrus cold press oil at 90 to 120° C. under reduced pressure (for example, about 10 to 150 Pa) is employed as the high-boiling point fraction in the invention.

The high-boiling point fraction thus obtained is usable as a taste enhancer. Alternatively, the high-boiling point fraction may be further purified and then used as a taste enhancer.

The high-boiling point fraction as described above has an excellent taste-enhancing effect in the case where an organic solvent solution containing the high-boiling point fraction at a concentration of 0.04 (mg/ml) has an ultraviolet absorbance of 0.01 or above.

That is to say, an excellent taste enhancing effect can be achieved in the case where a solution obtained by dissolving the high-boiling point fraction in normal hexane or ethyl acetate to give a concentration of 0.04 (mg/ml) has an ultraviolet absorbance at 311 nm of 0.01 or above. A further excellent taste enhancing effect can be established by high-boiling point fraction having the ultraviolet absorbance of from 0.02 to 3.0.

The high-boiling point fraction as described above is a mixture of nonvolatile components and so on. This mixture contains various coumarin analogs as well as a number of other compounds.

The above-described coumarin analogs mean a mixture of a plural number of compounds selected from coumarin compounds having the coumarin skeleton. There are known a large number of coumarin analog mixtures. Typical examples thereof include auraptene, marmin, limettin, melanzine, 5-geranoxy-7-methoxycoumarin, citroptene, bergaptene, bergamottin, bergaptol, epoxybergamottin, dihydroxybergamottin and 5-geranoxy-psoralen.

Alternatively, the high-boiling point fraction can be obtained from the pericarp of a citrus fruit. The citrus fruits as cited above are also usable as the citrus fruit herein. In this case, the citrus cold press oil is obtained from the pericarp of the citrus fruit by employing a publicly known method and then the high-boiling point fraction is obtained therefrom.

The taste enhancer containing the high-boiling point fraction as described above as the active ingredient has a considerable taste enhancing effect and can be relatively easily prepared. Thus, a taste enhancing effect can be advantageously achieved by using the taste enhancer.

The taste enhancer according to the invention may contain as the active ingredient a dewaxed high-boiling point fraction prepared from the above-described citrus cold press oil. The dewaxed high-boiling point fraction means the high-boiling point fraction which has been dewaxed and thus contains only an extremely small amount of wax (or no wax in some cases). The taste enhancer containing the dewaxed high-boiling point fraction as the active ingredient is superior in the taste enhancing effect to the taste enhancer containing the high-boiling point fraction as the active ingredient and, therefore, advantageous.

Accordingly, the invention further involves in its scope:

8) a taste enhancer comprising the dewaxed high-boiling point fraction of a citrus cold press oil as the active ingredient;

9) the taste enhancer, wherein the dewaxed high-boiling point fraction is a dewaxed product of a distillation residue after distillation of the citrus cold press oil;

10) the taste enhancer wherein a normal hexane or ethyl acetate solution containing the dewaxed high-boiling point fraction at a concentration of 0.04 (mg/ml) in normal hexane or ethyl acetate shows an ultraviolet absorbance of 0.01 or above;

11) a process for producing a taste enhancer comprising distilling a citrus cold press oil and dewaxing the distillation residue;

12) a food or a drink comprising a taste enhancer as set forth in any of 8) to 10);

13) a composition for the oral cavity comprising a taste enhancer as set forth in any of 8) to 10); and 14) a method of enhancing the taste of a food, a drink or a composition for the oral cavity comprising using a taste enhancer as set forth in any of 8) to 10).

The dewaxed high-boiling point fraction can be produced by various methods. Among all, it is favorable to employ a method wherein the high-boiling point fraction is obtained from the citrus cold press oil and then the high-boiling point fraction is dewaxed. The high-boiling point fraction may be produced by the above-described methods.

Next, the obtained high-boiling point fraction is dewaxed. As specific examples of the method for the dewaxing, the solvent treatment method and the column fractionation method will be illustrated.

In the solvent treatment method, the high-boiling point fraction obtained by, for example, the above-described method is dissolved in a solvent under heating and sufficiently dispersed therein by stirring. Then the dispersion is cooled and the solid wax is separated and eliminated therefrom. The dewaxed product thus obtained may be further treated to thereby eliminate wax.

More specifically speaking, methanol 10 times as much as the high-boiling point fraction is added thereto and the resulting mixture is heated on a water bath and stirred to thereby sufficiently disperse the high-boiling point fraction. After cooling to room temperature, the dispersion is allowed to stand in a freezer at −20° C. or below over day and night and then filtered through a Celite filter to thereby separate and eliminate wax. Moreover, the filtrate may be concentrated under reduced pressure and the thus obtained concentrate may be further purified by using column chromatography.

As another dewaxing treatment, the column fractionation method may be cited. In this method, the high-boiling point fraction (either as such or after diluted with a solvent) is purified by using column chromatography to thereby eliminate wax from the high-boiling-point fraction. Among all, a silica gel chromatograph method will be illustrated.

The high-boiling point fraction may be subjected to a pretreatment. For example, the high-boiling point fraction may be made highly viscous by heating. It is also possible to lower the viscosity of the high-boiling point fraction by further adding a solvent thereto. In this case, it is generally favorable to add the solvent in an amount of from 0.1 to 30 parts by weight, preferably from 0.5 to 20 parts by weight, per part by weight of the high-boiling point fraction. Although the solvent to be used herein is not particularly restricted, it is preferable to select a solvent wherein the high-boiling point fraction is soluble.

Subsequently, the high-boiling point fraction is poured into a column which has been preliminarily packed with, for example, silica gel. Thus, the high-boiling point fraction is once loaded on the silica gel. Next, an eluent containing a solvent is injected and the matters, once retained by the column are eluted together with the solvent. Then the solvent thus eluted is divided into several portions by a publicly known procedure. As the solvent, use can be made of hydrocarbons such as n-pentane, n-hexane, branched hexane, benzene and toluene; ethers such as diethyl ether; esters such as ethyl acetate and methyl acetate; alcohols such as methanol, ethanol and propanol; and so on. In the case of using a commonly employed silica gel chromatography, it is preferable to use hexane, ethyl acetate or a mixture thereof as the eluent. In the case of using a solvent mixture, the ratio of the solvents is not particularly restricted. Although the elution is usually carried out at room temperature, it may be performed at a lower or higher temperature without restriction.

It is preferable in the invention that the elution is carried out first with hexane alone, subsequently with a solvent mixture of hexane with ethyl acetate while gradually lowering the hexane content and thus finally with ethyl acetate alone.

Next, the solvent eluted by the above method is fractionated by a conventional procedure to give fractions. From a fraction rich in the coumarin analogs or such fractions combined together, the solvent is further distilled off under reduced pressure to give a concentrate. Thus the taste enhancer can be prepared. It is also possible to further repeat the purification procedures by, for example, treating the concentrate by high-performance liquid chromatography.

The dewaxed high-boiling point fraction as described above can be further fractionated and thus employed as a taste enhancer. The fractionation may be carried out by various methods. As a typical example thereof, the silica gel chromatograph method may be cited.

The dewaxed high-boiling point fraction thus obtained is a mixture of nonvolatile components. This mixture contains various coumarin analogs as well as a number of other compounds.

Typical examples of the coumarin analogs are those as cited above.

It is also possible to obtain the dewaxed high-boiling point fraction from the pericarp of a citrus fruit. The citrus fruits as cited above are also usable as the citrus fruit herein. In this case, the citrus cold press oil is obtained from the pericarp of the citrus fruit by employing a publicly known method. Then the high-boiling point fraction is obtained therefrom by employing the distillation method or the column method as described above. Further, dewaxing is carried out to thereby give the dewaxed high-boiling point fraction.

It is found out that the dewaxed high-boiling point fraction thus obtained has an excellent taste-enhancing effect in the case where an organic solvent solution containing the dewaxed high-boiling point fraction at a concentration of 0.04 (mg/ml) has an ultraviolet absorbance of 0.01 or above.

That is to say, an excellent taste enhancing effect can be achieved in the case where a solution obtained by dissolving the dewaxed high-boiling point fraction in normal hexane or ethyl acetate to give a concentration of 0.04 (mg/ml) has an ultraviolet absorbance at 311 nm of 0.01 or above. A further excellent taste enhancing effect can be established by dewaxed high-boiling point fraction having the ultraviolet absorbance of from 0.02 to 3.0.

The thus prepared taste enhancer can be added to foods, drinks and compositions for the oral cavity.

When added to foods or drinks, the taste enhancer according to the invention exhibits an excellent effect of remarkably enhancing the inherent taste (in particular, voluminousness, juiciness, deepness and mildness) of the foods or drinks, i.e., so-called taste enhancing effect.

In addition to foods and drinks, the taste enhancer according to the invention can enhance and improve the taste of compositions for the oral cavity. The examples of the compositions for the oral cavity include tooth pastes, tooth powders, tooth liquids, mouth washes, mouth washing liquors, mouse rinses, materials for tooth pastes, chewing gums, candies, cough drops, and materials to be held in the oral cavity or brought into contact with the skin in the oral cavity.

Specific examples of the foods and drinks as described above include fermented food products and processed milk products such as cheeses, butters, hard yogurts, soft yogurts and drink yogurts; drinks such as cool drinks, carbonated drinks, alcoholic drinks, fruit juice-containing drinks, tea-type drinks (for example, black tea drinks, green tea drinks, oolong tea drinks, Chinese tea drinks), lactic acid bacterium-fermented drinks with pH 5.0 or below, coffee drinks, milk drinks and milk-containing acidic drinks; confectionery such as jellies, mooses, puddings, creams, candies, chewing gums, chocolates, potato chips, cookies and biscuits; frozen/cold sweets such as ice creams, frozen yogurts and sherbets; breads, doughnuts, soups, curry sauces, stews, soups for noodles, dressings, mayonnaises, sauces, soy sauces, miso (fermented soybean pastes), jams, sausages, kamahoko (steamed fish paste) and so on.

The content of the taste enhancer in these foods, drinks and compositions for the oral cavity varies depending on, for example, the type of the foods, drinks and compositions for the oral cavity. It is generally preferable to add the taste enhancer in an amount of from 0.1 ppm to 5% by weight, still preferably from 1 ppm to 0.1% by weight and still preferably from 1 ppm to 100 ppm, to the foods, drinks and compositions for the oral cavity.

In the invention, the high-boiling point fraction or the dewaxed high-boiling point fraction of the citrus cold press oil as described above may be blended with other additives to give a taste enhancer. Examples of the additives include taste enhancers other than the taste enhancer of the invention (for example, hesperidin compounds such as hesperidin glycoside); preservatives such as sodium benzoate and potassium sorbate; antioxidants such as L-ascorbic acid and tocopherol; thickeners such as carboxymethylcellulose calcium and methylcellulose; coloring agents and colorants such as β-carotene, caramel, paprika, annatto and monasacus color; sweeteners such as aspartame, acesulfame potassium, xylitol and sucralose; souring agents such as lactic acid, citric acid and malic acid; seasonings such as sodium glutamate and L-theanine; emulsifiers such as sucrose fatty acid esters, glycerol fatty acid esters and lecithin; perfumes and flavors. The perfumes and flavors as described above are not particularly restricted, so long as they are usable in the foods, drinks and compositions for the oral cavity. For example, use may be made of citrus flavors, fruit flavors, savory flavors and the like. Examples of the citrus flavors include lemon, lyme, grapefruit and orange flavors. Examples of the fruit flavors include strawberry, apple, melon, pear, pineapple, grape, peach and banana flavors.

Among the sweeteners as cited above, aspartame, acesulfame potassium, xylitol and sucralose, which are synthetic sweeteners, have miscellaneous tastes such as bitterness and harshness. The taste enhancer according to the invention can relieve these miscellaneous tastes.

The taste enhancer may be added or blended directly to the foods, drinks or compositions for the oral cavity. Alternatively, a solution or a dispersion of the taste enhancer may be preliminarily prepared and then the solution or dispersion may be blended with the foods, drinks or compositions for the oral cavity. The solution or dispersion may preliminarily contain components or additives usually added or blended to the foods, drinks or compositions for the oral cavity.

Examples of the medium to be used for obtaining the solution or dispersion include monohydric alcohols such as water-containing ethanol, ethanol and benzyl alcohol; polyhydric alcohols such as glycerol; esters such as ethyl acetate; refined vegetable oils and edible oils such as coconut oil, corn salad oil, soybean oil, olive oil, rapeseed oil and safflower oil; and so on.

The amount of the taste enhancer to be added to the solution or dispersion largely varies depending on, for example, the foods, drinks or compositions for the oral cavity to which the taste enhancer is added. For example, the content thereof ranges from 10 ppm to 50% by weight.

Moreover, the taste enhancer according to the invention can be used together with flavors.

When blended with foods, drinks or compositions for the oral cavity, the taste enhancer according to the invention makes it possible to remarkably enhance the inherent taste (in particular, voluminousness, juiciness, deepness and mildness) of the foods, drinks or compositions for the oral cavity. Namely, when the high-boiling point fraction of a citrus cold press oil or the dewaxed high-boiling point fraction of a citrus cold press oil is added to flavors (for example, various citrus flavors, fruit flavors, savory flavors) or various synthetic sweeteners, the taste enhancer exhibits an excellent effect of remarkably enhancing the inherent taste (in particular, voluminousness, juiciness, deepness and mildness), i.e., so-called taste enhancing effect, thereby providing perfume preparations similar to natural flavors. Moreover, the taste enhancer can be used only in a small amount, which brings about an economical merit.

The present invention will now be illustrated in greater detail with reference to Examples and Test Examples in view of Comparative Examples, but it should be understood that the present invention is not limited thereto.

EXAMPLES 1 TO 4

Preparation of Taste Enhancer from Cold-Pressed Oil of Citrus Fruit Peel

One kilogram of cold-pressed oil of the peel of the citrus fruit shown in Table 1 below was put in the heating container of a distillation apparatus and gradually heated under reduced pressure (26 to 67 Pa). Volatile components were evaporated, liquefied in the condenser, and collected in a reservoir. When the temperature of the cold-pressed citrus oil in the heating container reached 120° C., heating was stopped. The residue in the heating container, i.e., the high-boiling fraction was 67 g from lemon peel, 183 g from lime peel, 70 g from grapefruit peel, and 39 g from orange peel.

A very small amount of ethyl acetate was added to 200 g of the high-boiling fraction and poured into a column packed with 4 kg of silica gel at room temperature.

The column was eluted successively with 30 L of n-hexane, 30 L of an ethyl acetate-hexane mixed solvent (10:90 by volume), 30 L of an ethyl acetate-hexane mixed solvent (20:80 by volume), and 30 L of ethyl acetate in this order to collect fractions 1, 2, 3, and 4, respectively.

Each fraction was evaporated to dryness in an evaporator. The weight proportion of the solid from each fraction to the total solid content is shown in Table 1. The ultraviolet absorbance of fraction 2 is shown in Table 2. The ultraviolet absorbance is an optical density (OD) of a solution of 4 mg of the resulting solid in 100 ml of n-hexane or ethyl acetate at 311 nm.

TABLE 1

| Fraction No. | Example 1 Lemon | Example 2 Lime | Example 3 Grapefruit | (unit: wt %) Example 4 Orange |
|---|---|---|---|---|
| 1 | 30 | 23 | 10 | 16 |
| 2 | 34 | 22 | 50 | 56 |
| 3 | 20 | 15 | 9 | 5 |
| 4 | 16 | 40 | 31 | 23 |

TABLE 2

| | 10% EtOAc/Hex Fraction | OD at 311 nm |
|---|---|---|
| Example 1 | lemon | 0.356 |
| Example 2 | lime | 0.256 |
| Example 3 | grapefruit | 0.091 |
| Example 4 | orange | 0.028 |

In the Table, EtOAC means ethyl acetate and Hex means n-hexane.

TEST EXAMPLE 1

Application to Strawberry Flavored Chewing Gum

The fractions or taste enhancers of Examples 1 to 4 were evaluated as follows. The results obtained are shown in Table 3.

a) Preparation of Samples:

The gum base, xylitol:maltitol (1:1 by weight), and thick malt syrup were thoroughly kneaded in a kneader. Citric acid was added, and kneading was continued. The flavor and the taste enhancer (or fraction) obtained in Examples 1 to 4 were then added, and kneading was continued. The kneading was carried out at the mixture temperature of 50° C. for 30 minutes. The resulting mixture was extruded to obtain chewing gum sticks 20 mm wide, 70 mm long, and 2 mm thick.

| | |
|---|---|
| Gum base | 21.000 wt % |
| Thick malt syrup | 13.000 wt % |
| Citric acid | 0.900 wt % |
| Strawberry flavor | 1.000 wt % |
| Taste enhancer or fraction | 0.002 wt % |
| Xylitol:maltitol (1:1 by weight) | balance |
| | 100.000 wt % | b) Evaluation

The chewing gum was organoleptically evaluated by a panel of 6 members in comparison with a control sample containing no taste enhancer and rated as follows. The criteria for evaluation are shown below.

A: Significant taste enhancement was observed.
B: Distinct taste enhancement was observed.
C: Slight taste enhancement was observed.
D: No taste enhancement was observed.

The results of evaluation are shown in Table 3.

TABLE 3

Taste enhancing effect of the high boiling point fractions by silica gel column

| Fraction | Lemon | Lime | Grapefruit | Orange |
|---|---|---|---|---|
| High-boiling Fraction* | C | C | C | C |
| 1** | D | D | D | D |
| 2 | A | A | A | A |
| 3 | A | A | A | A |
| 4 | B | B | B | B |
| 2 + 3 + 4*** | A | A | A | A |

Note:
*The distillation residue before silica gel column chromatography.
**Wax-rich fraction
***A mixture of fractions 2, 3, and 4.

A sample containing no taste enhancer was used as the control.

EXAMPLE 5

Preparation of Taste Enhancer A

The dewaxed high-boiling fraction obtained from fraction 3 of the high-boiling fraction of the cold-pressed orange peel oil was dissolved in benzyl alcohol to prepare a 20% solution, which is designated taste enhancer A.

TEST EXAMPLE 2

Application of Strawberry Flavored Chewing Gum

Chewing gum sticks were made in the same manner as in Test Example 1, except for using taste enhancer A prepared in Example 5.

The chewing gum was organoleptically evaluated by a panel of 6 members for (1) freshness, (2) sourness, (3) greenness, (4) sweetness, (5) juiciness, (6) body, and (7) titer and rated on the following 4-point scale.

For control, chewing gum containing benzyl alcohol in a final concentration of 0.008% in place of taste enhancer A was prepared and evaluated.

The scores for each taste by the 6 panel members were totaled and averaged. The average scores were shown in polygonal graph in FIG. 1. In the FIG. 1, "WITHOUT TASTE ENHANCER A" means that means that benzyl alcohol is added in an amount of 0.008% (as final concentration) instead of the taste enhancer a (the same applies hereinafter).

Scale for Evaluation:
  1: Not at all felt.
  2: Slightly felt.
  3: Felt.
  4: Strongly felt.

The overall taste enhancement by taste enhancer A was judged on a 4-point scale:
  1: No taste enhancement over the control was observed.
  2: Slight taste enhancement was observed.
  3: Distinct taste enhancement was observed.
  4: Strong taste enhancement was observed.

As a result, the 6 panel member scores on taste enhancer A averaged 4.0.

TEST EXAMPLE 3

Application to Apple Flavored Chewing Gum

Figure 2:
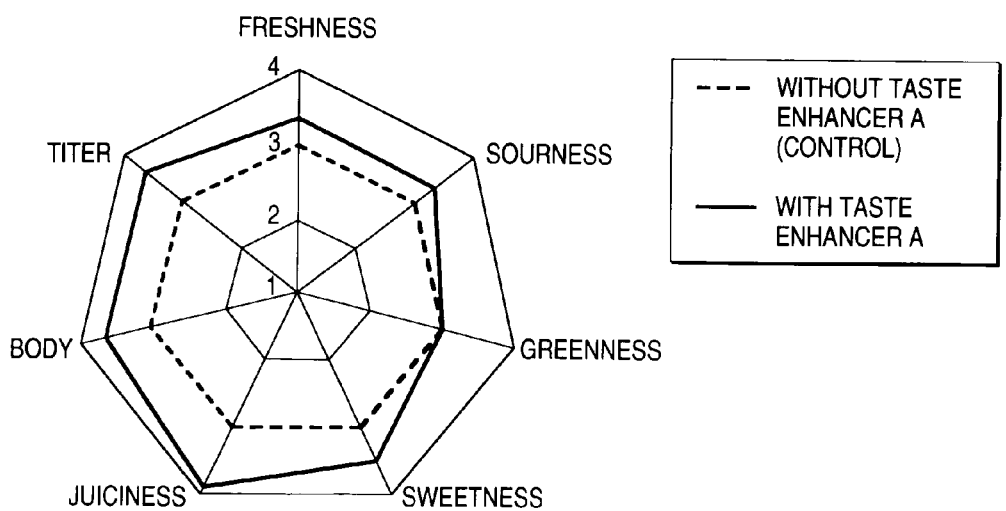
FIG. 2 is a graph showing the taste enhancement in apple flavored chewing gum in Test Example 3.

Taste enhancer A of Example 5 was evaluated as follows. The results obtained are shown in polygonal graph in FIG. 2.

a) Preparation of Sample:

The gum base, xylitol, and thick malt syrup were thoroughly kneaded in a kneader. Malic acid was added, and kneading was continued. The flavor and the taste enhancer A were then added, and kneading was continued. The kneading was carried out at the mixture temperature of 50° C. for 30 minutes. The resulting mixture was extruded to obtain chewing gum sticks 20 mm wide, 70 mm long, and 2 mm thick.

| | |
|---|---|
| Gum base | 24.000 wt % |
| Thick malt syrup | 5.000 wt % |
| Malic acid | 0.800 wt % |
| Apple flavor | 1.000 wt % |
| Taste enhancer A | 0.005 wt % |
| Xylitol | balance |
| total | 100.000 wt % | b) Evaluation

The chewing gum was organoleptically evaluated in the same manner as in Test Example 2 in comparison with control chewing gum prepared in the same manner as in Test Example 2.

The overall taste enhancement by taste enhancer A was judged on the same 4-point scale as in Test Example 2. As a result, the 6 panel member scores on taste enhancer A averaged 3.8.

TEST EXAMPLE 4

Application to Melon Flavored Chewing Gum

Figure 3:
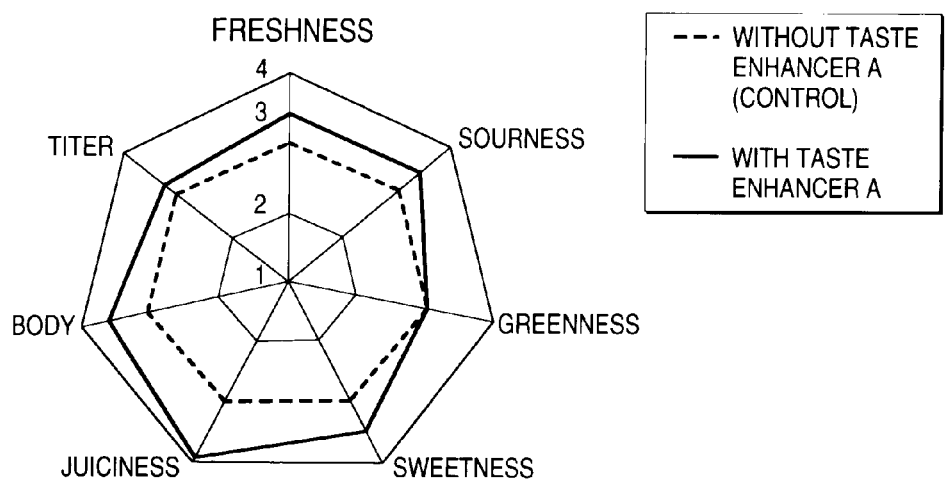
FIG. 3 is a graph showing the taste enhancement in melon flavored chewing gum in Test Example 4.

The taste enhancing performance of taste enhancer A in melon flavor-containing chewing gum prepared in the same manner as in Test Example 3 except that the melon flavor was used was organoleptically evaluated in the same manner as in Test Example 3. The control samples were prepared in the same manner as in Test Example 2. The results obtained are displaced in polygonal graph in FIG. 3.

The overall taste enhancement by taste enhancer A was judged on the same 4-point scale as in Test Example 2. As a result, the 6 panel member scores on taste enhancer A averaged 3.7.

TEST EXAMPLE 5

Application to Pear Flavored Chewing Gum

Figure 4:
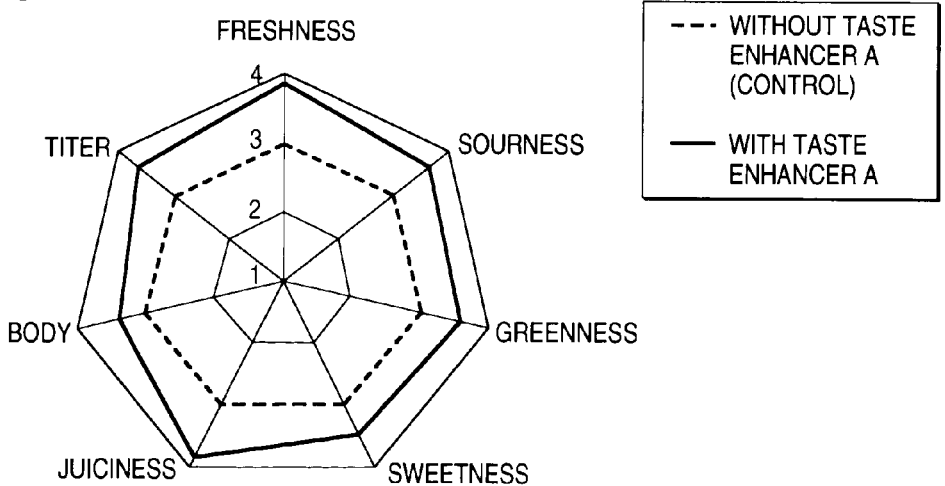
FIG. 4 is a graph showing the taste enhancement in pear flavored chewing gum in Test Example 5.

The taste enhancing performance of taste enhancer A in pear flavor-containing chewing gum prepared in the same manner as in Test Example 3 except that a pear flavor was used was organoleptically tested in the same manner as in Test Example 3. The control samples were prepared in the same manner as in Test Example 2. The results obtained are displaced in polygonal graph in FIG. 4.

The overall taste enhancement by taste enhancer A was judged on the same 4-point scale as in Test Example 2. As a result, the 6 panel member scores on taste enhancer A averaged 4.0.

As demonstrated in Test Examples 1 to 5, the dewaxed high-boiling fraction of cold-pressed citrus oil according to the present invention enhanced tastes such as freshness, sourness, greenness, sweetness, juiciness, body, and titer, namely, exhibited taste enhancing effects when used in combination with various flavors.

While the invention has been described in detail and with reference to specific embodiments thereof, it will be apparent to one skilled in the art that various changes and modifications can be made therein without departing from the scope thereof.

This application is based on Japanese patent applications No. 2002-031896 filed Feb. 8, 2002 and No. 2003-014082 filed Jan. 22, 2003, the entire contents thereof being hereby incorporated by reference.

What is claimed is:

1. A composition comprising (i) a high-boiling point fraction of a citrus cold press oil as the active ingredient, and (ii) at least one member selected from the group consisting of a fruit flavor, a savory flavor, and a sweetener, wherein the high boiling point fraction is one such that a normal hexane or ethyl acetate solution containing the high-boiling point fraction at a concentration of 0.04 (mg/ml) in normal hexane or ethyl acetate solution shows an ultraviolet absorbance at 311 nm of 0.01 or above.

2. A composition according to claim 1, wherein the high-boiling point fraction is a distillation residue after distillation of a citrus cold press oil.

3. A composition according to claim 1, wherein the at least one member selected from the group is the fruit flavor, and the fruit flavor is selected from the group consisting of strawberry, apple, melon, pear, pineapple, grape, peach and banana flavor, further wherein the high-boiling point fraction of a citrus cold press oil is the fraction remaining after heating citrus cold press oil at 90 to 120° C. under a pressure of about 10 to 150 Pa.

4. A composition according to claim 1, wherein the sweetener is selected from the group consisting of aspartame, acesulfame potassium, xylitol and sucralose, further wherein the high-boiling point fraction of a citrus cold press oil is the fraction remaining after heating citrus cold press oil at 90 to 120° C. under a pressure of about 10 to 150 Pa.

5. The method of enhancing the taste of a fruit flavor, a savory flavor, or a sweetener, which method comprises mixing the fruit flavor, savory flavor or sweetener with a high boiling point fraction of a citrus cold press oil as the active ingredient, wherein the high boiling point fraction is one such that a normal hexane or ethyl acetate solution containing the high-boiling point fraction at a concentration of 0.04 (mg/ml) in normal hexane or ethyl acetate shows an ultraviolet absorbance at 311 nm of 0.01 or above.

6. A method according to claim 5, wherein the high-boiling point fraction is a distillation residue after distillation of a citrus cold press oil.

7. A method of enhancing the taste of a fruit flavor, a savory flavor or a sweetener contained in a food, a drink or a composition for the oral cavity, which method comprises mixing a high boiling point fraction of a citrus cold press oil as the active ingredient, wherein the high boiling point fraction is one such that a normal hexane or ethyl acetate solution containing the high-boiling point fraction at a concentration of 0.04 (mg/ml) in normal hexane or ethyl acetate shows an ultraviolet absorbance at 311 nm of 0.01 or above.

8. A method according to claim 7, wherein the high-boiling point fraction is a distillation residue after distillation of a citrus cold press oil.

9. A composition according to claim 1, wherein the high-boiling point fraction of a citrus cold press oil is the fraction remaining after heating citrus cold press oil at 90 to 120° C. under a pressure of about 10 to 150 Pa.

10. A composition comprising (i) a high-boiling point fraction of a citrus cold press oil as the active ingredient, and (ii) at least one member selected from the group consisting of a fruit flavor, a savory flavor, and a sweetener, wherein said high-boiling point fraction of a citrus cold press oil is a dewaxed fraction, and wherein a normal hexane or ethyl acetate solution containing the high-boiling point fraction at a concentration of 0.04 (mg/ml) shows an ultraviolet absorbance at 311 nm of from 0.02 to 3.0, and wherein the high-boiling point fraction is a distillation residue after distillation of a citrus cold press oil remaining after heating the citrus cold press oil at 90 to 120° C. under a pressure of about 10 to 150 Pa.

* * * * *